No. 650,384. Patented May 29, 1900.
C. M. FEIST.
TROLLEY.
(Application filed Oct. 2, 1899.)
(No Model.)
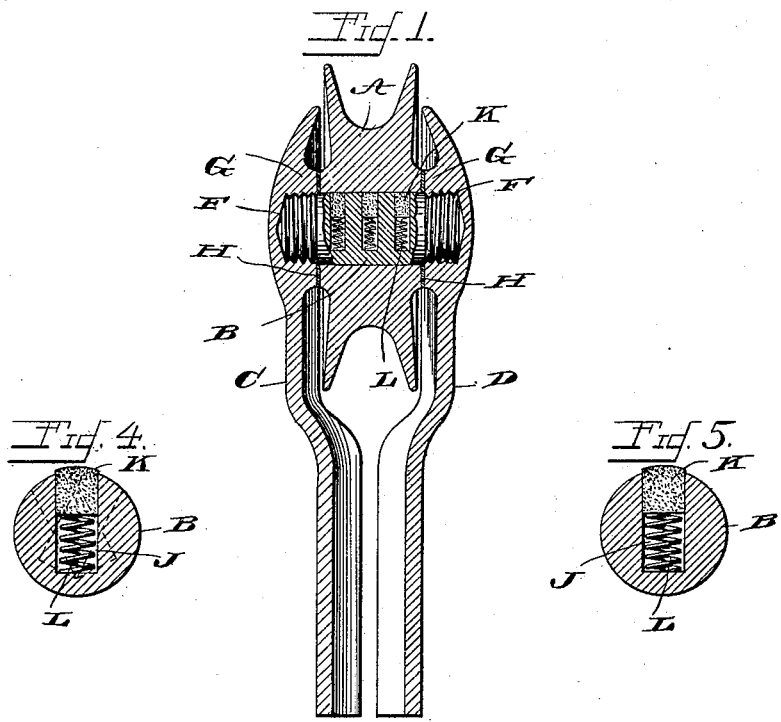
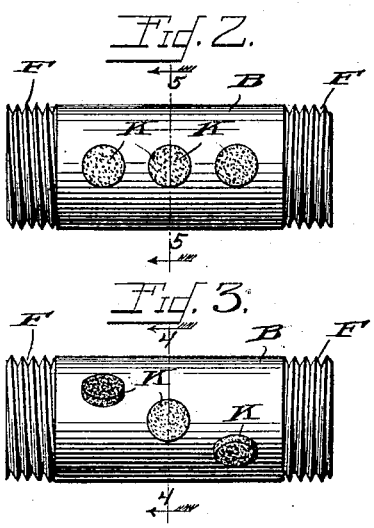

UNITED STATES PATENT OFFICE.

CHARLES M. FEIST, OF SIOUX CITY, IOWA.

TROLLEY.

SPECIFICATION forming part of Letters Patent No. 650,384, dated May 29, 1900.

Application filed October 2, 1899. Serial No. 732,314. (No model.)

*To all whom it may concern:*

Be it known that I, CHARLES M. FEIST, a citizen of the United States, residing at Sioux City, in the county of Woodbury and State of Iowa, have invented a new and useful Trolley, of which the following is a specification.

This invention relates to trolleys.

One object of the invention is to provide a bearing for trolley-wheels which is of simple construction and wherein provision is made for efficient lubrication.

Other objects of the invention will appear more fully hereinafter.

The invention consists, substantially, in the construction, combination, location, and arrangement of parts, all as will be more fully hereinafter set forth, as shown in the accompanying drawings, and finally set forth in the appended claims.

Referring to the accompanying drawings and to the various views and reference-signs appearing thereon, Figure 1 is a view in central section through a trolley-wheel and its bearing constructed in accordance with the principles of my invention. Fig. 2 is a detached detail view of the bearing pin or axle. Fig. 3 is a similar view showing a slightly-modified arrangement of the lubricant holes or recesses. Fig. 4 is a transverse section on the line 4 4, Fig. 3. Fig. 5 is a similar view on the line 5 5, Fig. 2.

Reference-sign A designates the trolley-wheel, B the axle upon which the trolley-wheel is journaled, and C D the two halves of the trolley-harp. The axle B is a solid axle and is threaded at each end, as indicated at F. Each half C D of the harp is provided with a boss G on the inside face thereof, and in each boss is formed a threaded socket to receive the threaded ends of the axle. If desired, a washer H may be interposed between the side faces of the trolley-wheel and the adjacent surfaces of the bosses G.

In the construction and operation of trolley-wheels it has been found that the life of the wheel depends in a large measure upon the efficiency of the lubrication of the wheel-bearing. In cases where the wheel-bearing is not efficiently lubricated the bore of the wheel wears away in parts or unevenly and rapidly becomes loose, causing destructive arcs between the wheel and its axis, which result in blistering or roughening of the surface of the bore of the wheel or the surface of the axle, and hence requiring frequent renewals and repairs. It is the primary object of the present invention to avoid this objection and to provide means for efficiently supporting the wheel and for lubricating its bearing, whereby the life of the wheel is greatly prolonged and the necessity for repairs and renewals greatly reduced. I have found that the best results are secured by employing a solid axle, upon which the wheel is directly mounted, the axle passing directly through the bore of the wheel, and in order to efficiently lubricate the wheel-bearing I form one or more sockets or recesses J in the solid axle, as by boring or slotting the axle transversely part way through, and in each socket or recess I mount a suitable lubricant K, preferably a conductor of electricity and in solid or stick form. For this purpose I may employ stick graphite, plumbago, stove-polish, or other suitable lubricating material. In order that the lubricating material may be maintained in efficient contact with the bearing-surface of the wheel, a suitable spring L may be placed in each socket or recess, said springs constantly acting to force the lubricating material outwardly and into contact with the bearing-surface of the wheel.

While I have shown a particular construction of harp, in which the trolley-wheel and axle are mounted, it is evident that the principles of my invention may be applied to any suitable or convenient construction of harp.

I have shown the axle provided with three recesses or slots; but it is evident that only one or any desired number may be employed. In Fig. 2 I have shown the seats or sockets arranged in a straight row; but it is evident that they may be arranged in any other desired relation, and in Fig. 3 I have shown them arranged in staggered relation.

I have found in practice that a trolley embodying the construction above described is durable, inexpensive to manufacture, and efficient. Blistering of the bore of the wheel or of the surface of the axle is avoided, and the life of the wheel is greatly prolonged without necessity for renewal or repairs.

Having now set forth the object and nature of my invention and a construction embodying the principles thereof and having described such construction, its purpose, function, and mode of operation, what I claim as new and useful and of my own invention, and desire to secure by Letters Patent, is—

1. In a trolley, a harp, a solid axle mounted therein, and a trolley-wheel directly mounted on said axle, said axle provided with one or more independent sockets or recesses formed part way therethrough, said sockets or recesses extending transversely of the axle, and a lubricant arranged in each of said sockets and constantly contacting with the bearing-surface of said wheel, as and for the purpose set forth.

2. In a trolley, a harp, an axle mounted therein, and a trolley-wheel directly mounted on said axle, said axle provided with one or more independent sockets or recesses formed part way therethrough, said sockets or recesses extending transversely across the axle, a spring arranged in each socket or recess, and a lubricating material also arranged in each of said sockets or recesses to be constantly pressed by said spring into contact with the bearing-surface of said wheel, as and for the purpose set forth.

In witness whereof I have hereunto set my hand, this 27th day of September, 1899, in the presence of the subscribing witnesses.

CHARLES M. FEIST.

Witnesses:
  E. L. KIRK,
  J. HENRY RICKER.